United States Patent [19]

Yamamoto et al.

[11] Patent Number: 5,747,122
[45] Date of Patent: May 5, 1998

[54] ANTIFERROELECTRIC LIQUID CRYSTAL CELL

[75] Inventors: Norio Yamamoto, Kariya; Takayuki Fujikawa, Ofu; Shunichi Koide; Yoshiichi Suzuki, both of Tokyo, all of Japan

[73] Assignee: Nippondenso Co., Ltd., Aichi-pref., Japan

[21] Appl. No.: 709,663

[22] Filed: Sep. 9, 1996

[30] Foreign Application Priority Data

Mar. 8, 1996 [JP] Japan .................. 8-051868

[51] Int. Cl.$^6$ .................................. G02F 1/1337
[52] U.S. Cl. .................. 428/1; 349/123; 349/135
[58] Field of Search .................. 428/1; 349/135, 349/123

[56] References Cited

U.S. PATENT DOCUMENTS

| 4,634,228 | 1/1987 | Iwasaki et al. ............ 428/1 |
| 5,046,823 | 9/1991 | Mori et al. ............ 359/56 |
| 5,612,450 | 3/1997 | Mizushima et al. ............ 428/1 |

FOREIGN PATENT DOCUMENTS

| 2-153322 | 6/1990 | Japan . |
| 3-121416 | 5/1991 | Japan . |

OTHER PUBLICATIONS

"Smectric Layer Rotation in Antiferroelectric Liquid Crystal," Ozaki, et al., JP.J. of App. Physics, vol. 33 (1994), pp. L-1620—L-1623.

Abstract Document in 21st Liquid Crystal Forum, Fujikawa et al., Sep. 10, 1995, pp. 88–89.

*Primary Examiner*—Alexander Thomas
*Attorney, Agent, or Firm*—Cushman Darby & Cushman IP Group of Pillsbury Madison & Sutro LLP

[57] ABSTRACT

Aligning films formed on electrode plates of a liquid crystal cell containing an antiferroelectric liquid crystal are each made of a polyimide film represented by the following chemical formula:

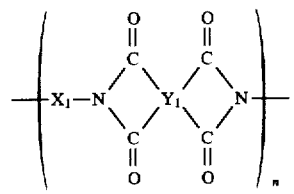

wherein $x_1$ and $Y_1$ are 4,4'-diaminoterphenyl and pyromellitic dianhydride each represented by the following chemical formulas:

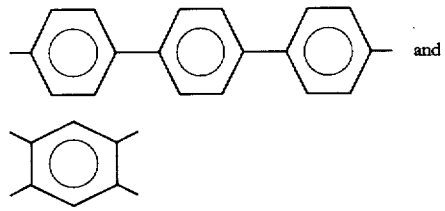

8 Claims, 4 Drawing Sheets

ANTIFERROELECTRIC LIQUID CRYSTAL CELL

BACKGROUND OF THE INVENTION

1. Field of the Invention

The present invention relates to liquid crystal cells employed in various liquid crystal apparatuses such as liquid crystal displays and liquid crystal shutters, and more specifically, it relates to liquid crystal cells which use antiferroelectric liquid crystals as the liquid crystals.

2. Description of the Related Art

In recent years, liquid crystal cells have been proposed which employ an antiferroelectric liquid crystal with 3 optically stable states (hereinafter referred to antiferroelectric liquid crystal cells) (see Japanese Unexamined Patent Publication No. 2-153322).

Antiferroelectric liquid crystals have a first optically stable state (antiferroelectric state) when free of electric fields and become oriented into a second optically stable state (ferroelectric state) or a third stable state (ferroelectric state of reverse polarity to the other ferroelectric state) under a unidirectional or reverse field, and these three stable states allow driving of high-speed switching based on the direction and strength of an applied voltage. The antiferroelectric liquid crystals also exhibit hysteresis whereby the variation in optical transmittance between the above-mentioned 3 stable states due to the applied voltage is shifted along the voltage axis.

It may be said that this gives antiferroelectric liquid crystals their superior characteristics of wide viewing angle, high response speed and high multiplex driving capability for the realization of large-screen high-definition displays.

Nevertheless, in order to achieve the desired driving characteristics with an antiferroelectric liquid crystal cell, the antiferroelectric liquid crystal must be in a uniform molecular alignment when no electric field is applied, and the uniform molecular alignment must cause effective field-induced switching between the antiferroelectric state and the ferroelectric states.

Such an orientation of the antiferroelectric liquid crystals, however, is difficult to achieve with precision across a wide area even by a rubbing treatment with an aligning film, and this has been a major obstacle to practical application of antiferroelectric liquid crystal cells.

Japanese Unexamined Patent Publication No. 3-121416 disclosed, as a different technique for achieving superior characteristics, one which concentrates on modifying the materials forming the aligning film to improve the initial orientation of the antiferroelectric liquid crystals, in order to realize a uniform molecular orientation across wide areas.

However, insufficient results have been obtained with only the aligning film-forming materials disclosed in this publication.

Furthermore, the technique described in Japanese Unexamined Patent Publication No. 3-12416 mentioned above has been inadequate for achieving sufficiently superior characteristics for the antiferroelectric liquid crystals and for realizing antiferroelectric liquid crystal cells with high reliability.

The reasons for this are believed to be as follows.

That is, when an antiferroelectric liquid crystal is exposed to an electric field and converted to a ferroelectric state, the antiferroelectric liquid crystals undergo spontaneous polarization while in that state. Thus, a very thick aligning film prevents a sufficient effective voltage from operating on the liquid crystal layer, making it impossible to obtain a precise orientation and leading to poor retention characteristics for display during multiplex driving.

Reducing the thickness of the aligning film has been considered as a countermeasure, by this weakens the orientation regulating capability of the aligning film. The result is poor uniformity of the initial oriented state of the antiferroelectric liquid crystal, or occurrence of a layer-rotation phenomenon of the liquid crystal layer (see report by Ozaki, M. et al. in Jpn. J. Appl. Phys., 33 pp. L1620–J1623, Part No. 11B (1994)).

It is, therefore, an object of the present invention to deal with these issues and to provide an antiferroelectric liquid crystal cell with adequately superior characteristics through the realization of a uniform molecular alignment across a wide area of an antiferroelectric liquid crystal, by concentrating on additional modification of the material forming the aligning film for improvement of the initial oriented state of the antiferroelectric liquid crystal.

It is another object of the present invention to provide a highly reliable antiferroelectric liquid crystal cell which has a satisfactory liquid crystal molecular orientation even with a thin aligning film, and which has excellent multiplex driving capability.

SUMMARY OF THE INVENTION

In order to achieve the aforementioned objects, the present inventors have conducted diligent research into modifying materials used to construct aligning films, and as a result we have found that it is effective to use a polymer film with a certain structure as the aligning film.

Specifically, according to a first embodiment of the present invention, a liquid crystal cell containing an antiferroelectric liquid crystal between two electrode plates is provided with aligning films on each electrode plate which are each formed of a polyimide film represented by the following chemical formula (1),

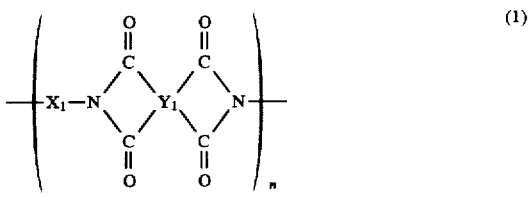

wherein $X_1$ in chemical formula (1) is 4,4'-diaminoterphenyl represented by the following chemical formula (2).

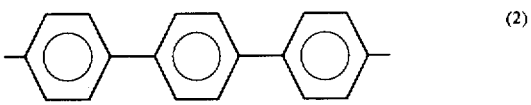

and $Y_1$ is a tetravalent carboxylate residue represented by any of the following chemical formulas (3) through (7).

-continued

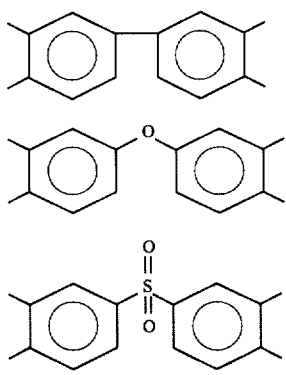
(5)

(6)

(7)

By using an aligning film with this specific structure for an antiferroelectric liquid crystal, it is possible to improve the initial oriented state of the antiferroelectric liquid crystal, and as a result realize a liquid crystal cell with a uniform liquid crystal molecular arrangement across a wide range.

Thus, since the superior electrooptical effect of an antiferroelectric liquid crystal may be adequately achieved, a notable effect is obtained for application to, for example, large-screen high-definition displays, TV screen displays, liquid crystal shutters, and the like.

Also, according to a second embodiment of the present invention, each aligning film is formed of a polyimide film represented by the following chemical formula (8).

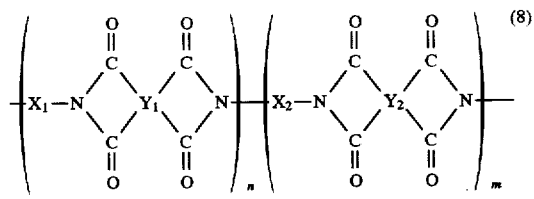
(8)

wherein $X_1$ and $X_2$ in chemical formula (8) are divalent amino group residues represented by the following chemical formula (2),

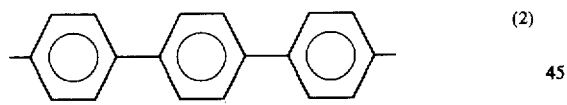
(2)

and $Y_1$ and $Y_2$ are tetravalent carboxylate residues represented by either of the following chemical formulas (3) or (6).

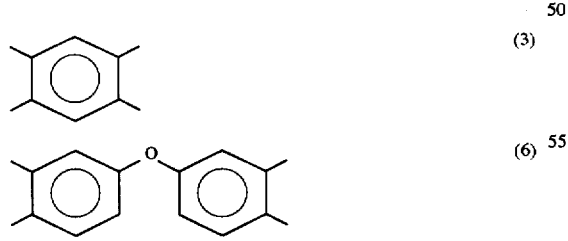
(3)

(6)

The same effect as that of first embodiment of the present invention described above may be achieved using an aligning film with this specific structure for the antiferroelectric liquid crystal.

Also, according to a third embodiment of the present invention, each orientation control film is formed of a polyimide film represented by the following chemical formula (9).

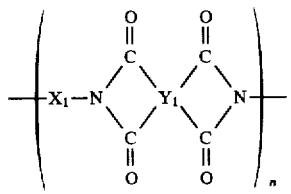
(9)

wherein $X_1$ in chemical formula (9) is a divalent amino group residue represented by any of the following chemical formulas (2) and (10) through (13).

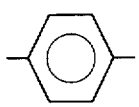
(10)

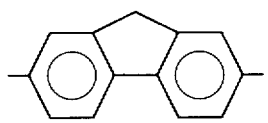
(11)

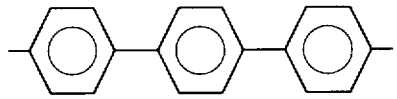
(2)

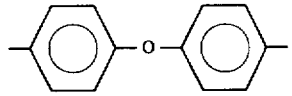
(12)

$Y_1$ is a tetravalent carboxylate residue represented by any of the following chemical formulas (3) through (7),

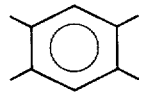
(3)

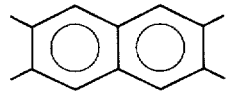
(4)

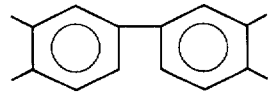
(5)

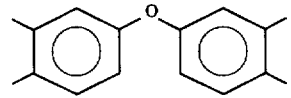
(6)

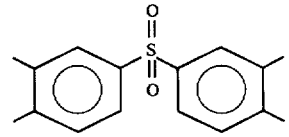
(7)

and the thickness of each aligning film is in the range of 100 Å to 400 Å.

Not only is the same effect naturally achieved as with the first embodiment of the present invention, but since the film thickness of each orientation control film is in the range of 100 Å to 400 Å with the specific structure described above, even when it is thin the orientation control film has aligning capability for uniform alignment of the liquid crystal molecules of the antiferroelectric liquid crystal. As a result, the liquid crystal cell is capable of maintaining high contrast.

Also, according to a fourth embodiment of the present invention, each aligning film is formed of a polyimide film represented by the following chemical formula (13).

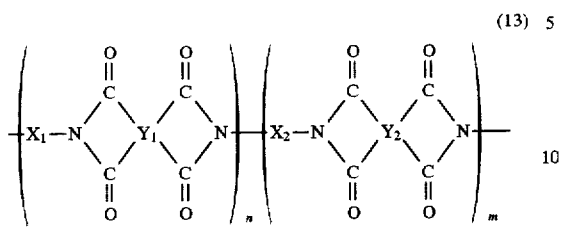
(13)

wherein $X_1$ and $X_2$ in chemical formula (13) are divalent amino group residues represented by the following chemical formula (2).

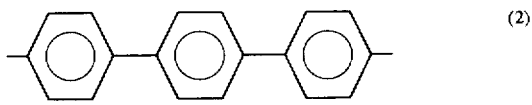
(2)

$Y_1$ and $Y_2$ are tetravalent carboxylate residues represented by either of the following chemical formulas 3) and (6).

(3)

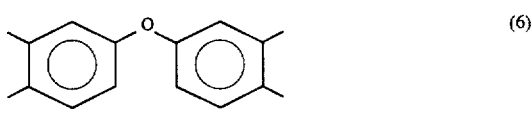
(6)

and the thickness of each aligning film is a value in the range of 100 Å to 400 Å.

The same effect as that of the third embodiment of the present invention is thereby achieved.

Also, according to a fifth embodiment of the present invention, the thickness of each orientation control film is a value in the range of 100 Å to 400 Å.

Thus, since the film thickness of each aligning film is a value in the range of 100 Å to 400 Å with the specific structure described above, even when it is thin the aligning film has aligning capability for uniform alignment of the liquid crystal molecules of the antiferroelectric liquid crystal. It is therefore possible to reduce the influence of spontaneous polarization of the antiferroelectric liquid crystal and adequately make use of the memory property of the double hysteresis characteristics. As a result, even with thin orientation control films, the effects of the first and second embodiments of the present invention may be achieved in a reliable manner.

Also, according to additional embodiments of the present invention, the difference between the respective optical retardations Δn·d representing the retardation (birefringence) created in each of the aforementioned aligning films by rubbing treatment is within ±0.25 nm.

Not only is it thereby possible to achieve the effects of the first through fifth embodiments of the present invention, but high contrast may be ensured without increase in the rubbing precision even if the aligning films are thin.

DETAILED DESCRIPTION OF THE PREFERRED EMBODIMENTS

Embodiments of the present invention will now be explained.

EXAMPLE 1

Figure 1:
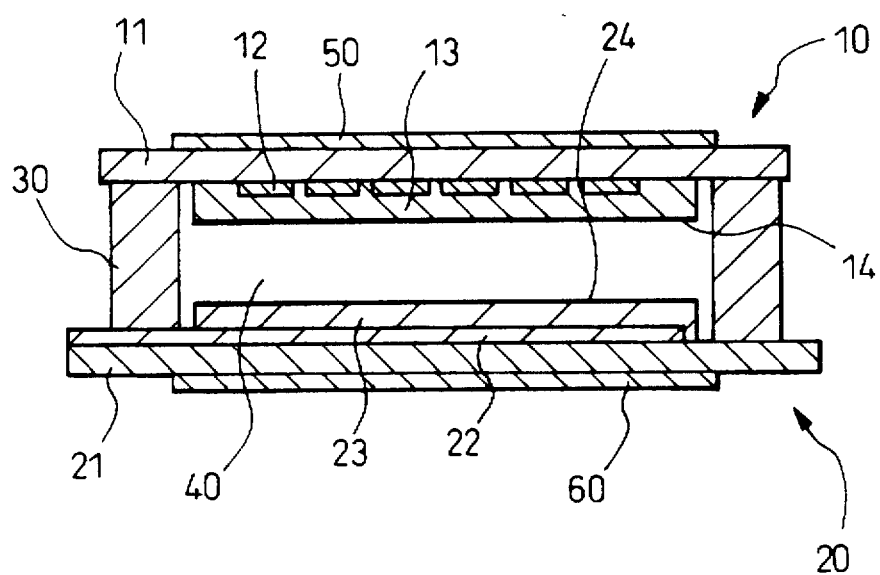
FIG. 1 is a schematic cross-sectional view of an embodiment of a liquid crystal cell according to the invention.

FIG. 1 shows the overall construction of a liquid crystal cell used for the present invention.

This liquid crystal cell is provided with two electrode plates 10, 20 and the two electrode plates 10, 20 are placed against each other via a belt-like seal 30 and a plurality of spacers (not shown).

The electrode plate 10 is provided with a transparent plate 11, and an array of transparent electrodes 12 are formed on the inner surface of the transparent plate 11. An insulating film 13 and aligning film 14 are also formed in that order on the inner surface of the transparent plate 11 and the array of transparent electrodes 12.

Likewise, the electrode plate 20 is provided with a transparent plate 21, and an array of transparent electrodes 22 are formed on the inner surface of the transparent plate 21 so as to compose a plurality of lattice elements together with the array of transparent electrodes 12. An insulating film 23 and aligning film 24 are also formed in that order on the inner surface of the transparent plate 21 and the array of transparent electrodes 22.

Antiferroelectric liquid crystals 40 are contained between the two electrode plates 10, 20. In FIG. 1, numbers 50 and 60 indicate polarizing plates. These polarizing plates 50, 60 are positioned so that their axes of polarization are orthogonal and so that light is not passed when no voltage is applied.

The method of forming the above-mentioned aligning films 14, 24 will now be explained.

Five mmol of 4,4'-diaminoterphenyl (represented by chemical formula (2) below) was added to 42.98 g of dry dimethylacetamide and dissolved therein while cooling in ice water under a nitrogen atmosphere. To the solution there was added 5.5 mmol of pyromellitic dianhydride (represented by chemical formula (3) below), and after standing from 10° C. to 15° C. and stirring for about an hour and a half under a nitrogen atmosphere, the mixture was further stirred for an hour and a half at room temperature. The resulting viscous solution was allowed to stand overnight at room temperature to synthesize polyamidocarboxylic acid.

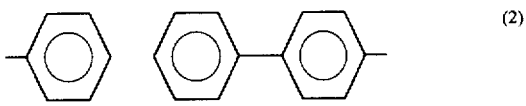
(2)

-continued

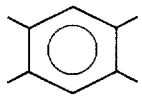
(3)

The viscosity of the polyamidocarboxylic acid synthesized in this manner was measured with an Ostwald viscometer in dimethylacetoamide at a concentration of 0.5 g/dl. The viscosity is shown in Table 1.

The polyamidocarboxylic acid obtained as described above was used to form a thin film by spin coating to a thickness in the range of 100 Å to 400 Å on the inner surface of a transparent plate 11 and an array of transparent electrodes 12, and firing for an hour at 200° C. for imidation yielded a polyimide film represented by the following chemical formula (1).

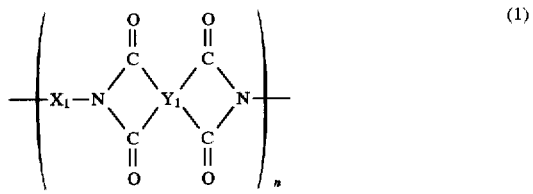

wherein $X_1$ in chemical formula (1) is 4,4'-diaminoterphenyl represented by chemical formula (2) given above and $Y_1$ is pyromellitic dianhydride represented by chemical formula (3) given above.

The surface of the polyimide film was subjected to unidirectional rubbing treatment with a nonwoven fabric made of nylon or polyester, to produce an aligning film 14. Another aligning film 24 was also formed in the same manner as the first aligning film 14.

The reason for the upper and lower limits for the film thickness of the two aligning films 14, 24 being 100 Å and 400 Å, respectively, will now be explained.

First, the lower limit for the film thickness of the two aligning films 14, 24 was set to 100 Å because a film thickness below this value prevents orientation of the antiferroelectric liquid crystals 40.

The upper limit for the film thickness of the two aligning films 24, 24 was set to 400 Å for the following reason.

This explanation concerns a case in which the multiplex driving method disclosed in Japanese Unexamined Patent Publication No. 2-173724 is used to drive the liquid crystal cell of Example 1.

Figure 2:
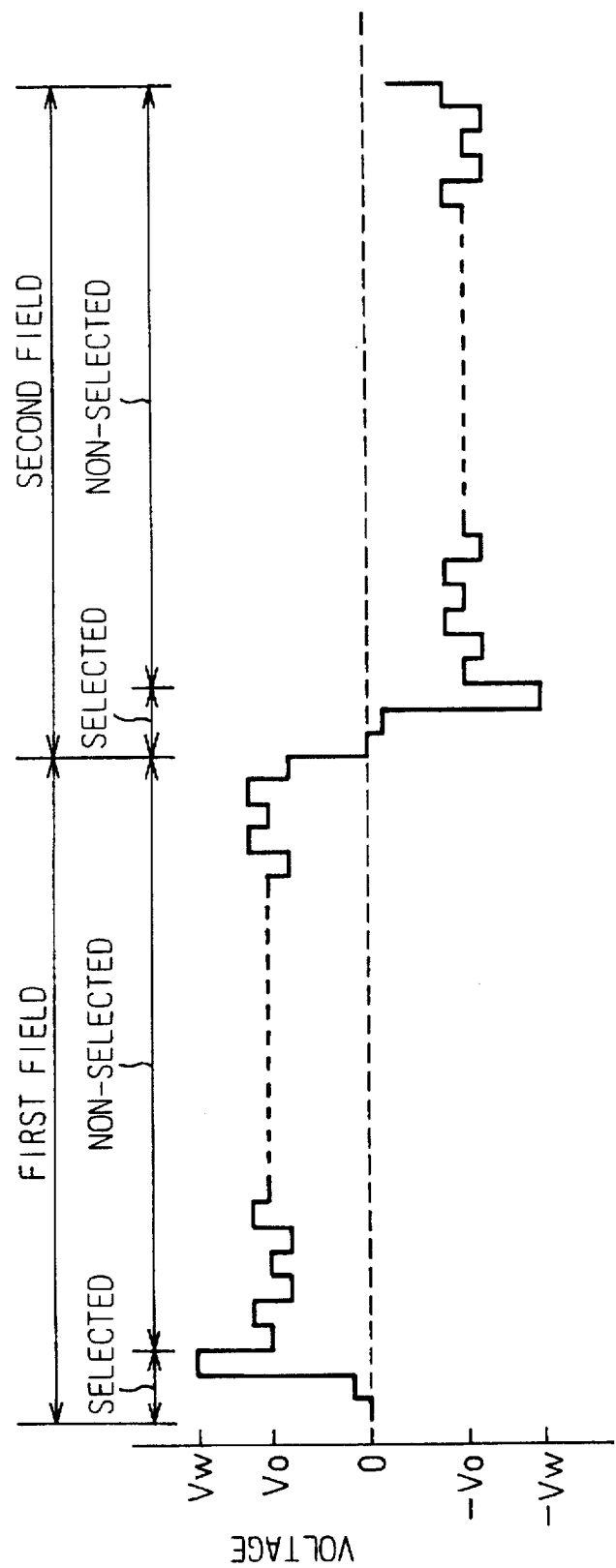
FIG. 2 is a timing chart showing the multiplex driving voltage waveform for a liquid crystal cell.

A voltage with the waveform shown in FIG. 2 is applied to desired picture elements of the liquid crystal cell via any of the transparent electrodes 12 and transparent electrodes 22. The voltage Vw applied during the select period is between about 20 V and 30 V, and the voltage Vo applied during the non-select period is between about 0 V and 10 V.

When a voltage with this waveform is applied to a liquid crystal cell in this manner, the voltage actually operating on the liquid crystal layer is the voltage resulting after capacity distribution in the antiferroelectric liquid crystals 40, both aligning films 14, 24 and both insulating films 13, 23.

An essential factor in an antiferroelectric liquid crystal cell is the effective voltage actually operating on the liquid crystal layer when the antiferroelectric "dark" state is written to the ferroelectric "bright" state during the select period and the "bright" state is maintained at the driving voltage $V_0$ during the non-select period. The effective voltage may be calculated by eliminating the field strength $E_2$ and $E_3$ from the following equations (1) and (2).

$$V_0 = d_1 E_1 + 2d_2 E_2 + 2d_3 E_3 \quad (1)$$

$$\epsilon_0 \epsilon_1 E_1 + P_s = \epsilon_0 \epsilon_2 E_2 = \epsilon_0 \epsilon_3 E_3 \quad (2)$$

In these equations (1) and (2), $d_1$ and $\epsilon_1$ respectively represent the thickness and the dielectric constant of the liquid crystal layer of the antiferroelectric liquid crystals. The parameters $d_2$ and $\epsilon_2$ respectively represent the thickness and dielectric constant of the aligning films.

Also, $d_3$ and $\epsilon_3$ respectively represent the thickness and dielectric constant of the insulating film. $E_1$, $E_2$ and $E_3$ respectively represent the field strengths operating on the liquid crystal layer of the antiferroelectric liquid crystals 40, the aligning film and the insulating film. $\epsilon_0$ represents the dielectric constant in a vacuum, and $P_s$ represents the spontaneous polarization of the antiferroelectric liquid crystals.

In this case, if the effective voltage during the non-select period is not at least a few volts, then the brightness of the "bright" state is attenuated and a high contrast display cannot be obtained. If the applied voltage $V_0$ is raised to ensure the necessary voltage, then the brightness of the "dark" state increases, which also prevents a high contrast display.

The voltage operating on the liquid crystal layer of the picture elements in the "dark" state may be calculated in the same manner using the following equation (3) instead of equation (2).

$$\epsilon_0 \epsilon_1 E_1 = \epsilon_0 \epsilon_2 E_2 = \epsilon_0 \epsilon_3 E_3 \quad (3)$$

Since there is no spontaneous polarization component of the antiferroelectric liquid crystal in the "dark" state, a higher voltage operates than on the picture elements in the "bright" state. Consequently, a trade-off relationship results between the brightnesses of the "bright" and "dark" states in this process of manipulating the application voltage $V_0$.

It is ultimately necessary to apply an effective voltage on the liquid crystal layer by selection of $\epsilon$ and $d$ for the aligning film and insulating film.

Thus, if the spontaneous polarization of the antiferroelectric liquid crystals is set to a value in the range of Ps=70 nC/cm² to 200 nC/cm², the dielectric constant of the aligning film is set to a value in the range of $\epsilon_2$=2 to 6 and the dielectric constant of the insulating film is set to a value in the range of $\epsilon_3$=10 to 50, then the upper limit for the thickness of the orientation control film will preferably be less than 400 Å.

The aligning capabilities of each of the aligning films 14, 24 thus formed were evaluated in the following manner.

In the Proceedings of the 17th Forum on Liquid Crystals, 1991, page 33, Nishino et al. have discussed measurement of optical retardations in the aligning film inner surface after rubbing as a general means for examining for orientation aborrations in liquid crystals for liquid crystal cells employing nematic liquid crystals as the liquid crystal crystals. The report explains that examination of aberrations in the aligning capability of aligning films is based on aberrations in the value of the optical retardation.

The report states that the polymer composing the orientation film is stretched along the axial direction by rubbing, and exhibits optical birefringence in the direction of rubbing. Thus, it is generally assumed that the liquid crystal molecules are uniformly oriented in the regions with a uniform degree of birefringence in the direction of rubbing. Here, the direction and degree of the birefringence is represented by the optical retardation Δn·d.

In Example 1, the examination method described in the above-mentioned report was used. Specifically, the measurement was conducted as follows. For measurement of the optical retardation in the aligning films, a model ADR-100XY high-sensitivity automatic birefringence measuring apparatus manufactured by Oak Laboratories was used. The measuring spot had a diameter of 1 mm.

For the measurement, the optical retardation in the same aligning film before and after rubbing was measured, and the optical retardation before rubbing was subtracted from the optical retardation after rubbing to eliminate the background influence. It was thus possible to calculate the birefringence of the aligning film created by rubbing, in terms of the optical retardation Δn·d.

In addition, through precise control of the rubbing conditions, the present inventors were able to adjust the difference in birefringence of the aligning films on the electrode plate to within a desired range. Here, the measured value for Δn·d was adjusted so as to approximately satisfy the inequality −0.25 nm ≤ Δn·d ≤ ±0.25 nm.

After examining both aligning films 24, 24 in the manner described above, the two electrode plates 10, 20 were placed against each other with the two aligning films 14, 24 facing each other in such a manner that their respective rubbing directions were parallel or opposite-parallel, after which the antiferroelectric liquid crystals 40 were injected.

The antiferroelectric liquid crystals used were 4-(1-trifluoromethylheptoxycarbonyl)phenyl-4'-octyloxybiphenyl-4-carboxylate (hereinafter referred to as TFMHPOBC), 4-(1-trifluoromethylheptoxycarbonyl)phenyl-4'-decylbiphenyl-4-carboxylate (hereinafter referred to as TFMHPDBC), 4-(methylheptoxycarbonyl)phenyl-4'-octyloxybiphenyl-4-carboxylate (hereinafter referred to as MHPOBC) and mixed solutions containing their homologs.

The mixed liquid crystals exhibit the following phase sequence.

(−20° C.) (70° C.) (72° C.) (85° C.)

crystallization→SmC$_A$*→SmC*→SmA→isotropic liquid

Here, the SmC$_A$* phase represents the antiferroelectric smectic liquid crystal phase, the SmC* phase represents the ferroelectric smectic liquid crystal phase and the SmA phase represents the paraelectric smectic liquid crystal phase.

The injection of the antiferroelectric liquid crystal is accomplished by heating them as an isotropic liquid (ISO) and utilizing the capillary phenomenon or vacuum exchange method, and this is followed by gradual cooling at a rate of 1° C. to 2° C. per minute until a chiral smectic CA phase (SmC$_A$* phase) is achieved.

The brightness of a dark state and driving margin of a liquid crystal cell prepared in this manner were measured. Coneration of the layer rotation phenomenon was also investigated upon prescribed multiplex driving with the liquid crystal cell.

The brightness of a dark state was measured using a transmission light intensity-detecting photoelectronic multiplier tube under a microscope. A lower brightness of a dark state signifies a more uniform orientation, which allows high contrast display.

Figure 3:
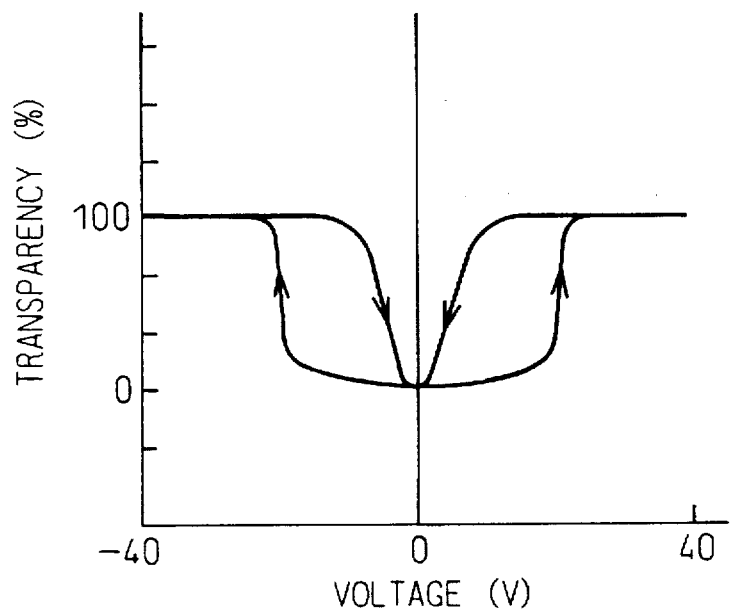
FIG. 3 is a characteristic graph showing the relationship between light transmittance and voltage for an antiferroelectric liquid crystal.

The driving margin was determined by applying a triangular wave voltage of 1 Hz to the liquid crystal cell, observing the double hysteresis characteristics as shown in FIG. 3, and performing the calculation according to the following equation (4).

$$\text{Driving margin } M = \frac{Vth(10) - Vth(90)}{Vsat(90) - Vth(10)} \quad (4)$$

In equation (4), Vth(10) is the voltage at which the light transmittance is 10% upon application of either a positive or negative voltage. Vsat(90) is the voltage at which the light transmittance is 90%, upon increase of either the positive or negative voltage. Vth(90) is the voltage at which the light transmittance is 90% upon reduction of either the positive or negative voltage.

The driving margin M is a reference parameter for the multiplex driving of a liquid crystal cell according to the invention. A value of M between 4 and 5 gives a display with high contrast and excellent gradation.

Figure 4:
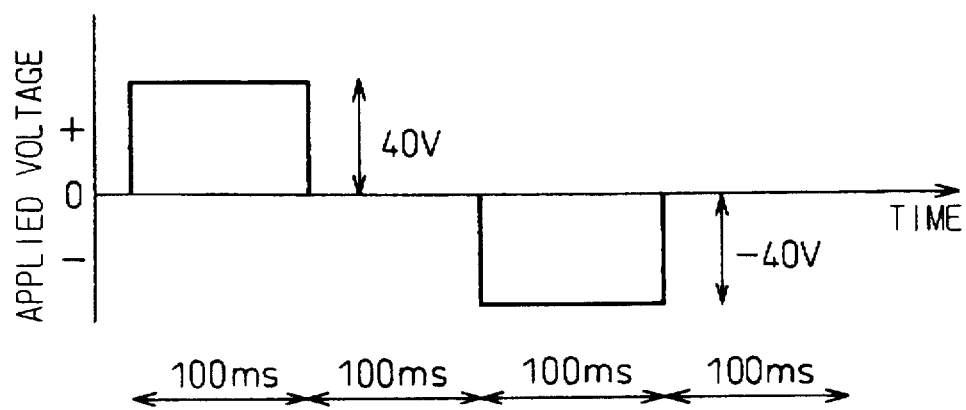
FIG. 4 is a timing chart showing the application voltage waveform for measurement of the layer-rotation phenomenon in a liquid crystal cell.

The occurrence of the layer rotation phenomenon by the liquid crystal layer was evaluated by applying the rectangular wave voltage shown in FIG. 4 for a few hours and then observing with a microscope to determine the degree to which the extinction position under no application of voltage shifted from the initial position. When the layer rotation angle θ of the liquid crystal layer shifts more than 1° from the original position, lower display contrast may be expected. The results of these evaluations are listed in Table 1.

Table 1 summarizes the evaluation results for sample liquid crystal cells according to Example 1 and Examples 2 through 15 described hereunder. The effectiveness of the present invention was demonstrated by appropriate comparative examples. A Model LQ-1800 liquid crystal cell by Hitachi Chemicals Co. and a Model CRD-8616 liquid crystal cell by Sumitomo Bakelite Co. were used for the comparative examples.

EXAMPLE 2

Five mmol of 4,4'-diaminoterphenyl (see chemical formula (2) above) was added to 47.71 g of dry dimethylacetamide and dissolved therein while cooling in ice water under a nitrogen atmosphere. To the solution there was added 5.5 mmol of 2,3,6,7-naphthalenetetracarboxylic dianhydride (represented by chemical formula (4) below), and the same method as in Example 1 was used to synthesize a polyamidocarboxylic acid.

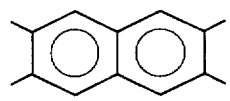

(4)

The viscosity of the polyamidocarboxylic acid synthesized in this manner was measured by the same method as in Example 1, and the measured viscosity is shown in Table 1.

The obtained polyamidocarboxylic acid was used to form a thin film on the inner surface of the transparent plate on the electrode plate by the same method as in Example 1, to give a polyimide film. For this polyimide film, X$_1$ in chemical formula (1) was 4,4'-diaminoterphenyl represented by chemical formula (2), and Y$_1$ was 2,3,6,7-naphthalenetetracarboxylic dianhydride represented by chemical formula (4). The polyimide film was used for the aligning films similar to Example 1 to form a liquid crystal cell.

The brightness of a dark state and driving margin M of the liquid crystal cell formed as described above were measured in the same manner as Example 1, and the results are listed in Table 1.

EXAMPLE 3

Five mmol of 4,4'-diaminoterphenyl (see chemical formula (2) above) was added to 50.17 g of dry dimethylacetamide and dissolved therein while cooling in ice water under a nitrogen atmosphere. To the solution there was added 5.5 mmol 4.4'-biphthalic anhydride (represented by chemical formula (5) below), and the same method as in Example 1 was used to synthesize a polyamidocarboxylic acid.

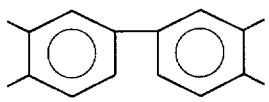 (5)

The viscosity of the polyamidocarboxylic acid synthesized in this manner was measured by the same method as in Example 1, and the results are listed in Table 1.

The obtained polyamidocarboxylic acid was used to form a thin film on the inner surface of the transparent plate on the electrode plate by the same method as in Example 1, to give a polyimide film. For this polyimide film, $X_1$ in chemical formula (1) was 4,4'-diaminoterphenyl represented by chemical formula (2), and $Y_1$ was 4,4'-biphthalic anhydride represented by chemical formula (5). The polyimide film was used for the aligning films similar to Example 1 to form a liquid crystal cell.

The brightness of a dark state and driving margin M of the liquid crystal cell formed as described above were measured in the same manner as Example 1, and the results are listed in Table 1.

EXAMPLE 4

Five mmol of 4,4'-diaminoterphenyl (see chemical formula (2) above) was added to 52.33 g of dry dimethylacetamide and dissolved therein while cooling in ice water under a nitrogen atmosphere. To the solution there was added 2.75 mmol of 4,4'-oxydiphthalic anhydride (represented by chemical formula (6) below) and 2.75 mmol of pyromellitic dianhydride (see chemical formula (3) above), and the same method as in Example 1 was used to synthesize a polyamidocarboxylic acid.

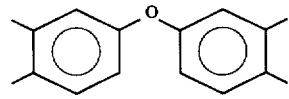 (6)

The viscosity of the polyamidocarboxylic acid synthesized in this manner was measured by the same method as in Example 1, and the results are listed in Table 1.

The obtained polyamidocarboxylic acid was used to form a thin film on the inner surface of the transparent plate on the electrode plate by the same method as in Example 1, to give a polyimide film represented by the following chemical formula (8).

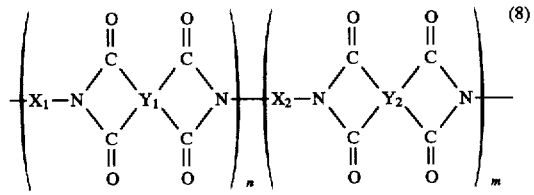 (8)

For this polyimide film, $X_1$ and $X_2$ in chemical formula (8) were 4,4'-diaminoterphenyls represented by chemical formula (2), and $Y_1$ and $Y_2$ were 4,4'-oxydiphthalic anhydrides represented by chemical formula (6). The polyimide film was used for the orientation control films similar to Example 1 to form a liquid crystal cell.

The brightness of a dark state and driving margin M of the liquid crystal cell formed as described above were measured in the same manner as Example 1, and the results are listed in Table 1.

EXAMPLE 5

Five mmol of 4,4'-diaminoterphenyl (see chemical formula (2) above) was added to 57.15 g of dry dimethylacetamide and dissolved therein while cooling in ice water under a nitrogen atmosphere. To the solution there was added 5.5 mmol of 4,4'-oxydiphthalic anhydride (represented by chemical formula (6) above), and the same method as in Example 1 was used to synthesize a polyamidocarboxylic acid.

The viscosity of the polyamidocarboxylic acid synthesized in this manner was measured by the same method as in Example 1, and the results are listed in Table 1.

The obtained polyamidocarboxylic acid was used to form a thin film on the inner surface of the transparent plate on the electrode plate by the same method as in Example 1, to give a polyimide film. For this polyimide film, $X_1$ in chemical formula (1) was 4,4'-diaminoterphenyl represented by chemical formula (2), and $Y_1$ was 4,4'-oxydiphthalic anhydride represented by chemical formula (6). The polyimide film was used for the aligning films similar to Example 1 to form a liquid crystal cell.

The brightness of a dark state and driving margin M of the liquid crystal cell formed as described above were measured in the same manner as Example 1, and the results are listed in Table 1.

EXAMPLE 6

Five mmol of 4,4'-diaminoterphenyl (see chemical formula (2) above) was added to 62.17 g of dry dimethylacetamide and dissolved therein while cooling in ice water under a nitrogen atmosphere. To the solution there was added 5.6 mmol of 3,3',4,4'-diphenylsulfonetetracarboxylic dianhydride (represented by chemical formula (7) below), and the same method as in Example 1 was used to synthesize a polyamidocarboxylic acid.

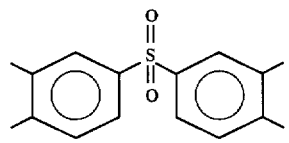 (7)

The viscosity of the polyamidocarboxylic acid synthesized in this manner was measured by the same method as in Example 1, and the results are listed in Table 1.

The obtained polyamidocarboxylic acid was used to form a thin film on the inner surface of the transparent plate on the electrode plate by the same method as in Example 1, to give a polyimide film. For this polyimide film, $X_1$ in chemical formula (1) was 4,4'-diaminoterphenyl represented by chemical formula (2), and $Y_1$ was 3,3',4,4'-diphenylsulfonetetracarboxylic dianhydride represented by chemical formula (7). The polyimide film was used for the aligning films similar to Example 1 to form a liquid crystal cell.

The brightness of a dark state and driving margin M of the liquid crystal cell formed as described above were measured in the same manner as Example 1, and the results are listed in Table 1.

EXAMPLE 7

Five mmol of p-phenylenediamine (see chemical formula (10) below) was added to 29.90 g of dry dimethylacetamide and dissolved therein while cooling in ice water under a nitrogen atmosphere. To the solution there was added 5.5 mmol of pyromellitic dianhydride (represented by chemical formula (3) above), and the same method as in Example 1 was used to synthesize a polyamidocarboxylic acid.

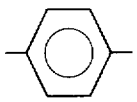
(10)

The viscosity of the polyamidocarboxylic acid synthesized in this manner was measured by the same method as in Example 1, and the results are listed in Table 1.

The thus obtained polyamidocarboxylic acid was used to form a thin film on an electrode plate by the same method as in Example 1, to give a polyimide film. For this polyimide film, $X_1$ in chemical formula (1) was p-phenylenediamine represented by chemical formula (10), and $Y_1$ was pyromellitic dianhydride represented by chemical formula (3). The polyimide film was used for the aligning films similar to Example 1 to form a liquid crystal cell.

The brightness of a dark state and driving margin M of the liquid crystal cell formed as described above were measured in the same manner as Example 1, and the results are listed in Table 1.

EXAMPLE 8

Five mmol of p-phenylediamine (see chemical formula (10) above) was added to 34.63 g of dry dimethylacetamide and dissolved therein while cooling in ice water under a nitrogen atmosphere. To the solution there was added 5.5 mmol of 2,3,6,7-naphthalenetetracarboxylic dianhydride (represented by chemical formula (4) above), and the same method as in Example 1 was used to synthesize a polyamidocarboxylic acid.

The viscosity of the polyamidocarboxylic acid synthesized in this manner was measured by the same method as in Example 1, and the results are listed in Table 1.

The obtained polyamidocarboxylic acid was used to form a thin film on the inner surface of the transparent plate on the electrode plate by the same method as in Example 1, to give a polyimide film. For this polyimide film, $X_1$ in chemical formula (1) was p-phenylenediamine represented by chemical formula (10), and $Y_1$ was 2,3,6,7-naphthalenetetracarboxylic dianhydride represented by chemical formula (4). The polyimide film was used for the aligning films similar to Example 1 to form a liquid crystal cell.

The brightness of a dark state and driving margin M of the liquid crystal cell formed as described above were measured in the same manner as Example 1, and the results are listed in Table 1.

EXAMPLE 9

Five mmol of p-phenylenediamine (see chemical formula (10) above) was added to 37.09 g of dry dimethylacetamide and dissolved therein while cooling in ice water under a nitrogen atmosphere. To the solution there was added 5.5 mmol of 4,4'-biphthalic anhydride (see by chemical formula (5) above), and the same method as in Example 1 was used to synthesize a polyamidocarboxylic acid.

The viscosity of the polyamidocarboxylic acid synthesized in this manner was measured by the same method as in Example 1, and the results are listed in Table 1.

The obtained polyamidocarboxylic acid was used to form a thin film on the inner surface of the transparent plate on the electrode plate by the same method as in Example 1, to give a polyimide film. For this polyimide film, $X_1$ in chemical formula (1) was p-phenylenediamine represented by chemical formula (10), and $Y_1$ was 4,4'-biphthalic anhydride represented by chemical formula (5). The polyimide film was used for the aligning films similar to Example 1 to form a liquid crystal cell.

The brightness of a dark state and driving margin M of the liquid crystal cell formed as described above were measured in the same manner as Example 1, and the results are listed in Table 1.

EXAMPLE 10

Five mmol of 2,7-diaminofluorene (represented by chemical formula (11) below) was added to 37.47 g of dry dimethylacetamide and dissolved therein while cooling in ice water under a nitrogen atmosphere. To the solution there was added 5.5 mmol of pyromellitic dianhydride (see chemical formula (3) above), and the same method as in Example 1 was used to synthesize a polyamidocarboxylic acid.

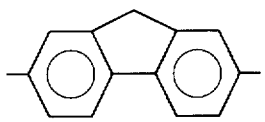
(11)

The viscosity of the polyamidocarboxylic acid synthesized in this manner was measured by the same method as in Example 1, and the results are listed in Table 1.

The obtained polyamidocarboxylic acid was used to form a thin film on the inner surface of the transparent plate on the electrode plate by the same method as in Example 1, to give a polyimide film. For this polyimide film, $X_1$ in chemical formula (1) was 2,7-diaminofluorene represented by chemical formula (11), and $Y_1$ was pyromellitic dianhydride represented by chemical formula (3). The polyimide film was used for the aligning films similar to Example 1 to form a liquid crystal cell.

The brightness of a dark state and driving margin M of the liquid crystal cell formed as described above were measured in the same manner as Example 1, and the results are listed in Table 1.

EXAMPLE 11

Five mmol of 2,7-diaminofluorene (see chemical formula (11) above) was added to 42.21 g of dry dimethylacetamide and dissolved therein while cooling in ice water under a nitrogen atmosphere. To the solution there was added 5.5 mmol of 2,3,6,7-naphthalenetetracarboxylic dianhydride (see by chemical formula (4) above), and the same method as in Example 1 was used to synthesize a polyamidocarboxylic acid.

The viscosity of the polyamidocarboxylic acid synthesized in this manner was measured by the same method as in Example 1, and the results are listed in Table 1.

The obtained polyamidocarboxylic acid was used to form a thin film on the inner surface of the transparent plate on the electrode plate by the same method as in Example 1, to give a polyimide film. For this polyimide film, $X_1$ in chemical formula (1) was 2,7-diaminofluorene represented by chemical formula (11), and $Y_1$ was 2,3,6,7-naphthalenetetracarboxylic dianhydride represented by chemical formula (4). The polyimide film was used for the aligning films similar to Example 1 to form a liquid crystal cell.

The brightness of a dark state and driving margin M of the liquid crystal cell formed as described above were measured in the same manner as Example 1, and the results are listed in Table 1.

EXAMPLE 12

Five mmol of 2,7-diaminofluorene (see chemical formula (11) above) was added to 44.66 g of dry dimethylacetamide and dissolved therein while cooling in ice water under a nitrogen atmosphere. To the solution there was added 5.5 mmol of 4,4'-biphthalic anhydride (see chemical formula (5) above), and the same method as in Example 1 was used to synthesize a polyamidocarboxylic acid.

The viscosity of the polyamidocarboxylic acid synthesized in this manner was measured by the same method as in Example 1, and the results are listed in Table 1.

The obtained polyamidocarboxylic acid was used to form a thin film on the inner surface of the transparent plate on the electrode plate by the same method as in Example 1, to give a polyimide film. For this polyimide film, $X_1$ in chemical formula (1) was 2,7-diaminofluorene represented by chemical formula (11), and $Y_1$ was 4,4'-biphthalic anhydride represented by chemical formula (5). The polyimide film was used for the aligning films similar to Example 1 to form a liquid crystal cell.

The brightness of a dark state and driving margin M of the liquid crystal cell formed as described above were measured in the same manner as Example 1, and the results are listed in Table 1.

EXAMPLE 13

Five mmol of 4,4'-diaminodiphenyl ether (represented by chemical formula (12) below) was added to 37.82 g of dry dimethylacetamide and dissolved therein while cooling in ice water under a nitrogen atmosphere. To the solution there was added 5.5 mmol of pyromellitic dianhydride (see chemical formula (3) above), and the same method as in Example 1 was used to synthesize a polyamidocarboxylic acid.

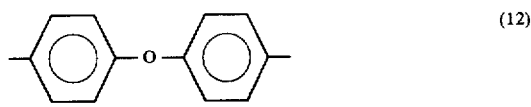

(12)

The viscosity of the polyamidocarboxylic acid synthesized in this manner was measured by the same method as in Example 1, and the results are listed in Table 1.

The obtained polyamidocarboxylic acid was used to form a thin film on the inner surface of the transparent plate on the electrode plate by the same method as in Example 1, to give a polyimide film. For this polyimide film, $X_1$ in chemical formula (1) was 4,4'-diaminodiphenyl ether represented by chemical formula (12), and $Y_1$ was pyromellitic dianhydride represented by chemical formula (3). The polyimide film was used for the aligning films similar to Example 1 to form a liquid crystal cell.

The brightness of a dark state and driving margin M of the liquid crystal cell formed as described above were measured in the same manner as Example 1, and the results are listed in Table 1.

EXAMPLE 14

Five mmol of 4,4'-diaminodiphenyl ether (see chemical formula (12) above) was added to 42.55 g of dry dimethylacetamide and dissolved therein while cooling in ice water under a nitrogen atmosphere. To the solution there was added 5.5 mmol of 2,3,6,7-naphthalenetetracarboxylic dianhydride (see chemical formula (4) above), and the same method as in Example 1 was used to synthesize a polyamidocarboxylic acid.

The viscosity of the polyamidocarboxylic acid synthesized in this manner was measured by the same method as in Example 1, and the results are listed in Table 1.

The obtained polyamidocarboxylic acid was used to form a thin film on the inner surface of the transparent plate on the electrode plate by the same method as in Example 1, to give a polyimide film. For this polyimide film, $X_1$ in chemical formula (1) was 4,4'-diaminodiphenyl ether represented by chemical formula (12), and $Y_1$ was 2,3,6,7-naphthalenetetracarboxylic dianhydride represented by chemical formula (4). The polyimide film was used for the aligning films similar to Example 1 to form a liquid crystal cell.

The brightest of a dark state and driving margin M of the liquid crystal cell formed as described above were measured in the same manner as Example 1, and the results are listed in Table 1.

EXAMPLE 15

Five mmol of 4,4'-diaminodiphenyl ether (see chemical formula (12) above) was added to 45.01 g of dry dimethylacetamide and dissolved therein while cooling in ice water under a nitrogen atmosphere. To the solution there was added 5.5 mmol of 4,4'-biphthalic anhydride (see chemical formula (5) above), and the same method as in Example 1 was used to synthesize a polyamidocarboxylic acid.

The viscosity of the polyamidocarboxylic acid synthesized in this manner was measured by the same method as in Example 1, and the results are listed in Table 1.

The obtained polyamidocarboxylic acid was used to form a thin film on the inner surface of the transparent plate on the electrode plate by the same method as in Example 1, to give a polyimide film. For this polyimide film, $X_1$ in chemical formula (1) was 4,4'-diaminodiphenyl ether represented by chemical formula (12), and $Y_1$ was 4,4'-biphthalic anhydride represented by chemical formula (5). The polyimide film was used for the aligning films similar to Example 1 to form a liquid crystal cell.

The brightness of a dark state and driving margin M of the liquid crystal cell formed as described above were measured in the same manner as Example 1, and the results are listed in Table 1.

TABLE I

| | Viscosity (dl/g) | Brightness of a dark state (%) | Driving margin | Layer rotation Difference in Δn·d within ±0.25 | Difference in Δn·d outside of ±0.25 |
|---|---|---|---|---|---|
| Example 1 | 1.32 | 0.57 | 11.9 | o | Δ |
| Example 2 | 1.38 | 0.56 | 12.6 | o | — |
| Example 3 | 1.22 | 0.80 | 12.7 | o | — |
| Example 4 | 1.30 | 0.50 | 8.0 | o | — |
| Example 5 | 1.33 | 0.42 | 5.4 | o | — |
| Example 6 | 1.15 | 0.49 | 6.3 | o | — |
| Example 7 | 1.44 | 0.75 | 6.0 | o | — |
| Example 8 | 0.84 | — | — | — | — |
| Example 9 | 0.95 | 0.71 | 5.9 | o | — |
| Example 10 | 1.38 | 0.80 | 8.3 | o | — |
| Example 11 | 1.18 | — | — | — | — |

TABLE I-continued

|  | Viscosity (dl/g) | Brightness of a dark state (%) | Driving margin | Layer rotation | |
|---|---|---|---|---|---|
|  |  |  |  | Difference in Δn·d within ±0.25 | Difference in Δn·d outside of ±0.25 |
| Example 12 | 0.81 | 0.87 | 10.4 | ○ | — |
| Example 13 | 1.09 | 0.51 | 7.0 | ○ | X |
| Example 14 | 2.04 | 0.72 | 6.9 | ○ | — |
| Example 15 | 1.20 | 0.59 | 6.3 | ○ | — |
| Comp. Ex. 1 | — | 2.55 | 1.1 | — | — |
| Comp. Ex. 2 | — | 1.68 | 2.2 | — | — — |

○: layer rotation angle 1° or less
Δ: layer rotation angle 2° or less
X: layer rotation angle 3° or greater Of Examples 1 through 15 described above, Examples 1 through 6 utilize aligning films with specific chemical structures for the antiferroelectric liquid crystals, thus allowing improvement in the initial oriented state of the antiferroelectric liquid crystals, to result in realization of liquid crystal cells with a uniform liquid crystal molecule arrangement across a wide area.

Consequently, since the superior electrooptical effect of an antiferroelectric liquid crystal may be adequately exhibited, a notable effect is obtained with application to, for example, large-screen high-definition displays, TV screen displays, liquid crystal shutters, and the like.

Furthermore, all of the Examples 1 through 15 except for Examples 8 and 11 had lower brightnesses of dark states than the comparative examples, as shown by Table 1. It can also be seen that lower brightnesses of dark states result in more uniform orientation of the antiferroelectric liquid crystal. It is therefore possible to achieve high contrast displays with the liquid crystal cells, unlike those of the comparative examples.

In addition, all of the Examples 1 through 15 except for Examples 8 and 11 had driving margins M of 4, 5 or greater and higher than the comparative examples, as also shown in Table 1. This allows a more reliable high contrast than with Comparative Examples 1 and 2.

Moreover, all of the Examples 1 through 15 except for Examples 8 and 11 had layer rotation angles of θ of 1° or less when the Δn·d difference (difference between Δn·d created by rubbing treatment of the aligning film on the electrode plate 10 and Δn·d created by rubbing treatment of the aligning film on the electrode plate 20) was within ±0.25. This provided low-cost antiferroelectric liquid crystal cells without requiring higher precision for rubbing treatment of the aligning films and without using highly expensive production equipment.

Figure 5:
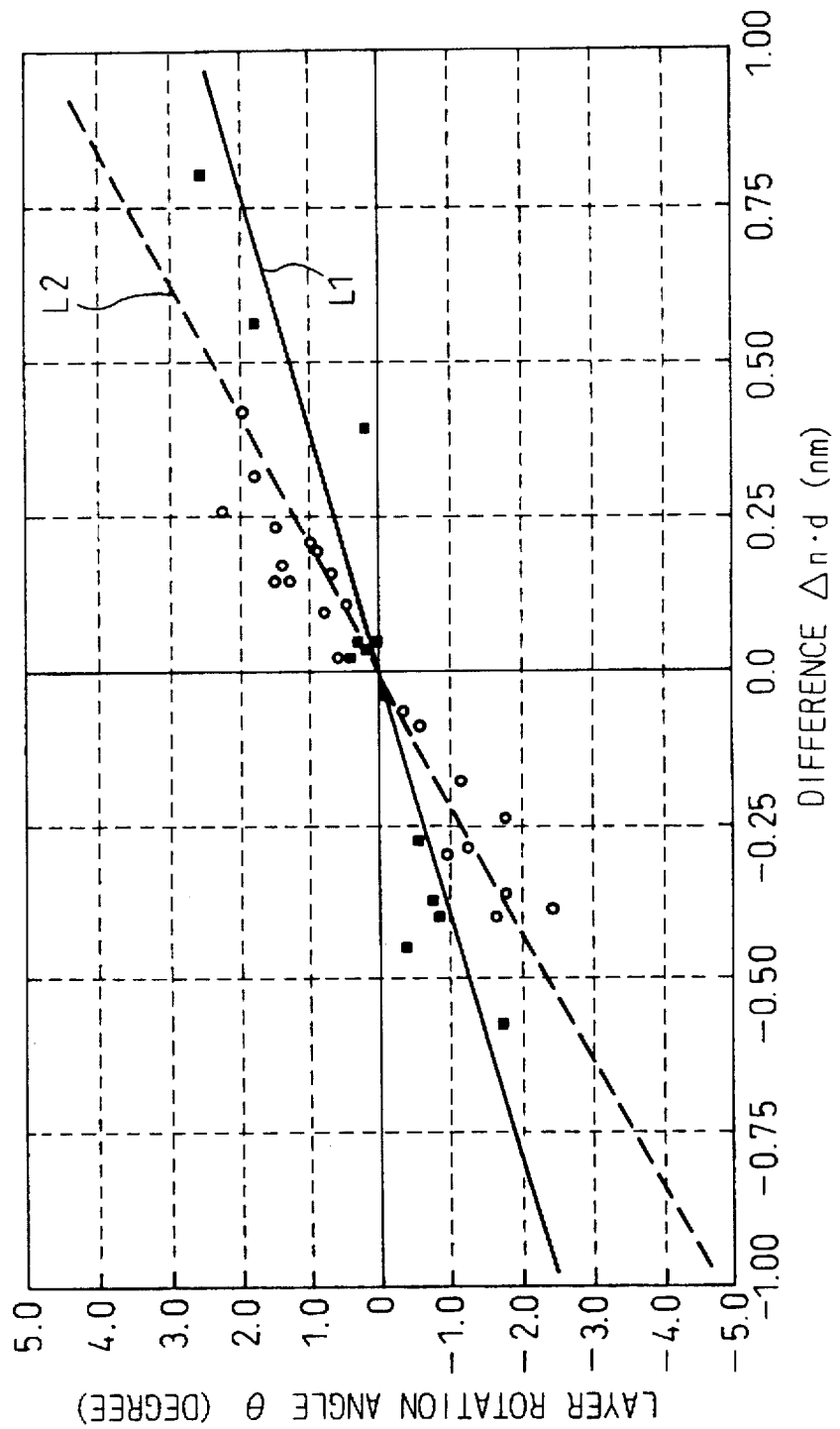
FIG. 5 is a graph showing the relationship between the layer-rotation angle θ and difference in the optical retardations Δn·d for the liquid crystal layers of antiferroelectric liquid crystals in the liquid crystal cells of Examples 1 and 13.

Furthermore, the relationship between the layer rotation angle θ and the difference in Δn·d was investigated to clearly determine the effect where $X_1$ was terphenyl-based when the material used to form the aligning films was a compound represented by chemical formula (1) in Example 1, and this gave the results indicated by the solid line L1 in FIG. 5.

For comparison, the relationship between the layer rotation angle θ and the difference in Δn·d was also investigated for Example 13 with no terphenyl-based compound, and this gave the results shown by the broken line L2. In FIG. 5, +θ corresponds to clockwise layer rotation and −θ corresponds to counter-clockwise layer rotation. For the difference in Δn·ds, + was used when the Δn·d of the electrode plate 10 was larger than the Δn·d of the electrode plate 20, and − was used when it was smaller.

It is thereby demonstrated that the layer rotation angle θ is small even with a large difference in Δn·ds. In the case of Example 13, the difference in the Δn·ds of the upper and lower aligning films must be within ±0.25 nm in order to keep the layer rotation angle within ±1° so that the display contrast is not reduced, but in Example 1 where a terphenyl-based compound was used, the allowable range for the difference in Δn·ds was about twice as wide. This shows, as indicated by the symbol "Δ" for Example 1 in the right column of Table 1, that the layer rotation angle may sometimes by under 2° even when the difference in Δn·ds is outside of ±0.25 nm.

As indicated by the symbol "x" for Example 13 in the right column of Table 1, the layer rotation angle is unsatisfactory at over 3° when the difference in Δn·ds is outside of ±0.25 nm.

As explained above, when $X_1$ is a terphenyl-based compound, less precision is required during the rubbing treatment process and lower cost is achieved.

We claim:

1. An antiferroelectric liquid crystal cell comprising two electrode plates and an antiferroelectric liquid crystal injected between the two electrode plates, both of said electrode plates having aligning films on their respective inner surfaces in contact with said antiferroelectric liquid crystal, wherein each of said aligning films is formed of polyimide film represented by the following chemical formula (9),

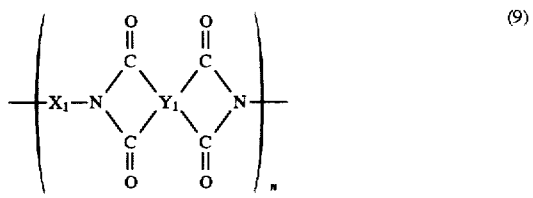

wherein $X_1$ in chemical formula (9) is a divalent amino group residue represented by any of the following chemical formulas (10), (11), (2), or (12),

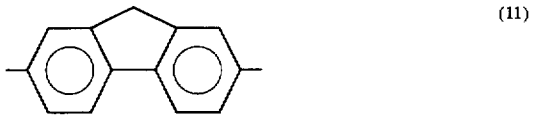

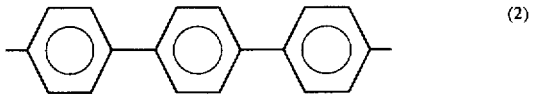

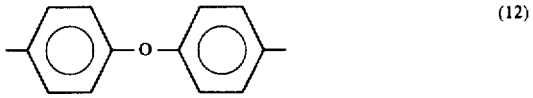

wherein $Y_1$ is a tetravalent carboxylate residue represented by any of the following chemical formulas (3) through (7),

-continued

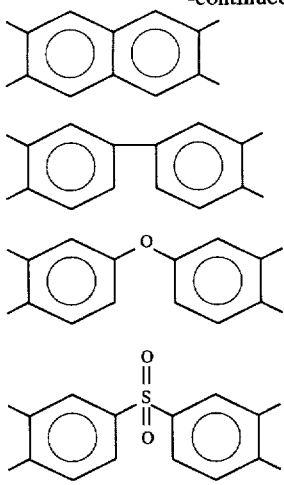

and wherein each of said aligning films has a thickness in the range of from 100 Å to less than 400 Å.

2. An antiferroelectric liquid crystal cell according to claim 1, wherein the difference between the respective optical retardations Δn·d representing the birefringence created in each of said aligning films by rubbing treatment is within ±0.25 nm.

3. An antiferroelectric liquid crystal cell comprising two electrode plates and an antiferroelectric liquid crystal injected between the two electrode plates, both of said electrode plates having aligning films on their respective inner surfaces in contact with said antiferroelectric liquid crystal, wherein each of said aligning films is formed of a polyimide film represented by the following chemical formula (13).

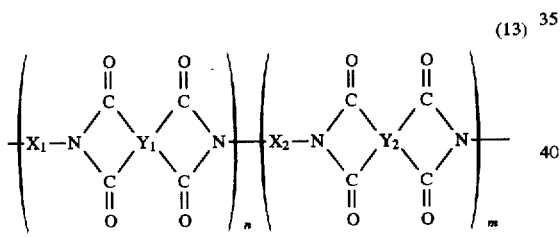
(13)

wherein $X_1$ and $X_2$ in chemical formula (13) is a divalent amino group residue represented by any of the following chemical formula (2).

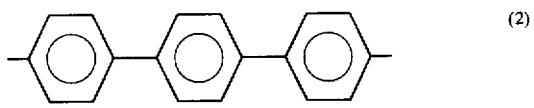
(2)

wherein $Y_1$ and $Y_2$ are tetravalent carboxylate residues represented by either of the following chemical formulas (3) and (6),

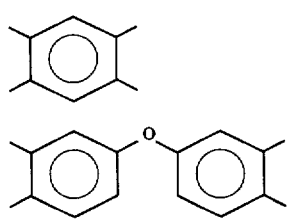
(3)

(6)

and wherein each of said aligning films has a thickness in the range of 100 Å to less than 400 Å.

4. An antiferroelectric liquid crystal cell according to claim 3, wherein the difference between the respective optical retardations Δn·d representing the birefringence created in each of said aligning films by rubbing treatment is within ±0.25 nm.

5. An antiferroelectric liquid crystal cell comprising two electrode plates and an antiferroelectric liquid crystal injected between the two electrode plates, both of said electrode plates having aligning films on their respective inner surfaces in contact with said antiferroelectric liquid crystal, wherein each of said aligning films is formed of a polyimide film represented by the following chemical formula (1).

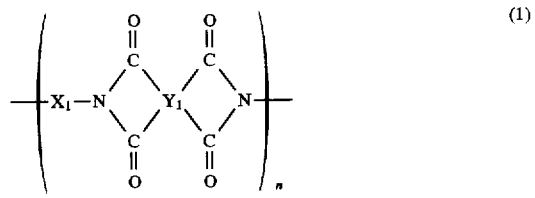
(1)

wherein $X_1$ in chemical formula (1) is a 4,4'-diaminoterphenyl represented by the following chemical formula (2),

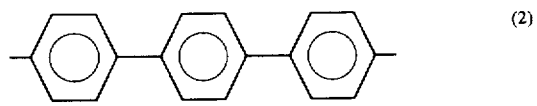
(2)

and wherein $Y_1$ is a tetravalent carboxylate residue represented by any of the following chemical formulas (3) through (7)

(3)

(4)

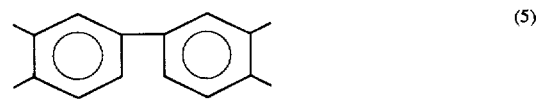
(5)

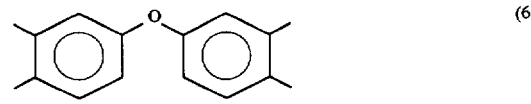
(6)

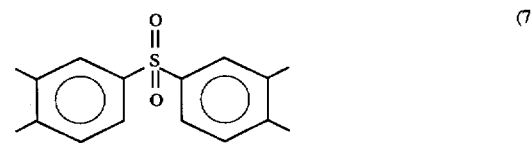
(7)

wherein each of said aligning films has a thickness in the range of 100 Å to less than 400 Å.

6. An antiferroelectric liquid crystal cell according to claim 5, wherein the difference between the respective optical retardations Δn·d representing the birefringence created in each of said aligning films by rubbing treatment is within ±0.25 nm.

7. An antiferroelectric liquid crystal cell comprising two electrode plates and an antiferroelectric liquid crystal injected between the two electrode plates, both of said electrode plates having aligning films on their respective inner surfaces in contact with said antiferroelectric liquid crystal, wherein each of said aligning films is formed of a polyimide film represented by the following chemical formula (1),

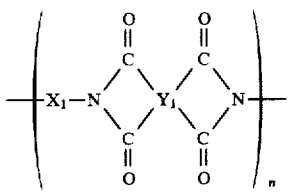
(1)

wherein $X_1$ in chemical formula (1) is a 4,4'-diaminoterphenyl represented by the following chemical formula (2),

(2)

and $Y_1$ is a tetravalent carboxylate residue represented by any of the following chemical formulas (3) through (7)

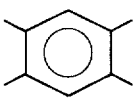
(3)

(4)

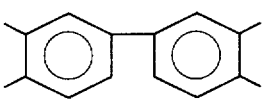
(5)

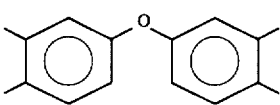
(6)

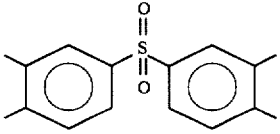
(7)

wherein the difference between the respective optical retardations Δn·d representing the birefringence created in each of said aligning films by rubbing treatment is within ±0.25 nm.

8. An antiferroelectric liquid crystal cell comprising two electrode plates and an antiferroelectric liquid crystal injected between the two electrode plates, both of said electrode plates having aligning films on their respective inner surfaces in contact with said antiferroelectric liquid crystal, wherein each of said aligning films is formed of a polyimide film represented by the following chemical formula (8),

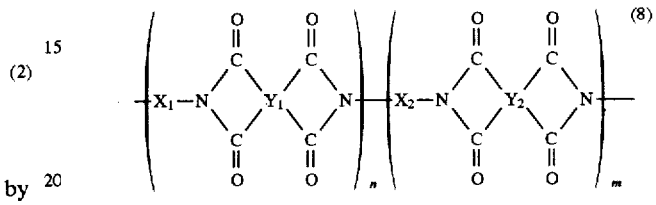
(8)

wherein $X_1$ and $X_2$ in chemical formula (8) are divalent amino group residues represented by the following chemical formula (2),

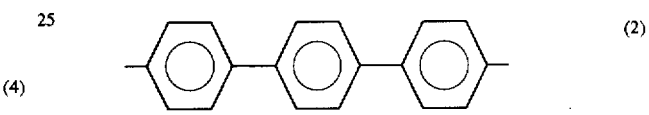
(2)

and $Y_1$ and $Y_2$ are tetravalent carboxylate residues represented by any of the following chemical formulas (3) or (6)

(3)

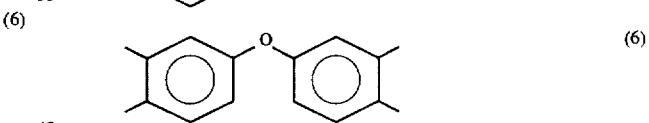
(6)

wherein the difference between the respective optical retardations Δn·d representing the birefringence created in each of said aligning films by rubbing treatment is within ±0.25 nm.

* * * * *

UNITED STATES PATENT AND TRADEMARK OFFICE
CERTIFICATE OF CORRECTION

PATENT NO. : 5,747,122
DATED : May 5, 1998
INVENTOR(S) : Yamamoto, et. al.

It is certified that error appears in the above-identified patent and that said Letters Patent is hereby corrected as shown below:

Title page, item [73], Assignee: add-- Showa Shell Sekiyu Kabushiki Kaisha, Tokyo, Japan --.

Signed and Sealed this

Seventeenth Day of November, 1998

*Attest:*

BRUCE LEHMAN

*Attesting Officer*  *Commissioner of Patents and Trademarks*